United States Patent [19]

Stogner

[11] Patent Number: 4,739,931
[45] Date of Patent: Apr. 26, 1988

[54] FLAP SUPPORT ARRANGEMENT

[75] Inventor: Claude R. Stogner, Palm Beach Gardens, Fla.

[73] Assignee: United Technologies Corporation, Hartford, Conn.

[21] Appl. No.: 34,456

[22] Filed: Apr. 6, 1987

[51] Int. Cl.⁴ .................................................. B05B 3/04
[52] U.S. Cl. ............................ 239/265.19; 239/127.1; 60/228
[58] Field of Search ............. 239/127.1, 127.3, 265.17, 239/265.19, 265.25, 265.27, 265.29, 509, 512; 60/228, 232

[56] References Cited
U.S. PATENT DOCUMENTS
4,098,076 7/1978 Young et al. .............. 239/265.19 X
4,605,169 8/1986 Mayers ............................ 239/265.29

Primary Examiner—Andres Kashnikow
Assistant Examiner—Mary Beth O. Jones
Attorney, Agent, or Firm—Troxell K. Snyder

[57] ABSTRACT

A transverse pivotable flap is cantilevered between movable sidewall members (10) which include a stub flap (14). A removable central flap portion (18) is secured between the stub flats (10) by a pair of joints (26) having alternating lug sets 28, 30, secured by respective elongated pins (32, 34). Flow area (40) is provided to conduct internal cooling air (16) into the central flap portion (18).

3 Claims, 1 Drawing Sheet

FLAP SUPPORT ARRANGEMENT

This invention was made with Government support under a contract awarded by the Department of the Air Force. The Government has certain rights in this invention.

FIELD OF THE INVENTION

The present invention relates to a joint for supporting a flap in an exhaust nozzle of a gas turbine engine.

BACKGROUND

Flow directing flaps in a gas turbine engine exhaust nozzle are subject to extremely harsh environmental conditions which have a significant impact on the design criteria of the overall flap arrangement and individual components. Exhaust gas temperatures may reach 4,000 F. or higher in the engine afterburning mode, requiring the use of temperature resistant materials and internal cooling to enable the gas contacting flap surfaces to withstand such temperatures for extended periods. The static gas pressure forces exerted on such flaps may range up to 50 psi (345 kPa) or greater depending upon the operational configuration of the nozzle and the current engine power output.

It is further desirable that such flaps be light in weight and easily disassembled for service or replacement. Disassembly is further complicated by the cramped clearances typically available within the nozzle for admitting workers, tools, etc.

In one design of a transversely extending flap in a thrust vectoring exhaust nozzle the flap is linked at the span ends to a pair of opposed sidewall disks which, under the influence of a positive internal static gas pressure, impart a resultant moment to the flap span ends for reducing the magnitude of the mid span flap deflection as fully explained in copending U.S. application Ser. No. 019,996 filed Feb. 27, 1987 by C. R. Stogner and W. M. Madden, titled "Exhaust Nozzle Flap Assembly". The combination of moment and shear forces at the span ends of such transversely oriented flaps results in a complicated pattern of stress at any joint located in such region, increasing the amount of reinforcing material, and hence weight, required to accommodate such forces as well as complicating the ducting of sufficient cooling gas into the flap interior.

What is needed is a simple, lightweight joint for securing an internally cooled flap in an exhaust nozzle of a gas turbine engine or the like.

SUMMARY OF THE INVENTION

It is therefore an object of the present invention to provide a means for supporting a flow diverting flap in an exhaust nozzle of a gas turbine engine.

It is further an object of the present invention to provide a supporting means which includes a rigid flap joint disposed between a removable central portion of the flow diverting flap and a pair of spaced apart, supporting sidewall members.

It is further an object of the present invention to provide a flap joint having a relatively large internal flow area for conducting a flow of cooling gas from the interior of the sidewall member into the interior of the removable flap central portion.

It is still further an object of the present invention to locate the flap joint or joints at a point along the flap span coincident with the absence of any transverse bending moment therein.

According to the present invention, a strong, simple joint is provided between two spaced apart, supporting sidewall members and a removable, central flap portion of a transversely extending flow diverting flap. The flap is cantilevered between the sidewall members and is positioned thereby for diverting at least a portion of the flowing exhaust gas stream for nozzle thrust vectoring, reversing, area control, etc.

The joint between the flap portion and the corresponding sidewall member further includes two spaced apart, parallel sets of hinge-like lugs, alternating between the sidewall member and the removable central flap portion. Each set of alternating lugs is linked by an elongated pin passing through the aligned lugs similar to the hinge pin in an ordinary hinge. The spaced apart hinge-like connections provide a simple, inflexible link between the supporting sidewall members and the cantilevered central flap portion.

The flap joint according to the present invention further provides ample flow area in the spanwise direction for conducting a cooling gas, such as air, from the interior of the sidewall member into the interior of the removable central flap portion without compromising the structural integrity of the intermediate joint. The flap portion is easily released from the sidewall support by withdrawing the elongated pins from the lug sets and removing the now released flap portion from the nozzle. Reversing this procedure easily and quickly resecures the flap portion without the use of complicated fastening means, etc.

Another feature of the joint arrangement according to the present invention is the spanwise location of the individual joints at points of zero absolute bending moment in the assembled flap. For those flaps subject to positive static gas pressure at the surface thereof, it has been found advantageous to impart a counteracting moment at the span ends of the cantilevered flap to offset the moment resulting from the gas static pressure loading over the flap span. By locating the flap joints between the central portion and the sidewall members at span locations having zero resultant moment, the present invention reduces the magnitude and complexity of the forces on the individual joint components. By eliminating the bending forces in the joints, the present invention reduces the weight and size of the flap structure adjacent the joints, thereby permitting an even greater interior flow area for admitting cooling air into the flap interior. The spaced apart hinge-like connections of the present invention are well suited to withstand the remaining simple shear forces present at the zero moment span locations, achieving the reliable, simple, lightweight arrangement desired.

Both these and other objects and advantages of the joint arrangement according to the present invention will be apparent to those skilled in the art upon review of the following description and the appended claims and drawing figures.

DETAILED DESCRIPTION OF THE INVENTION

Figure 1:
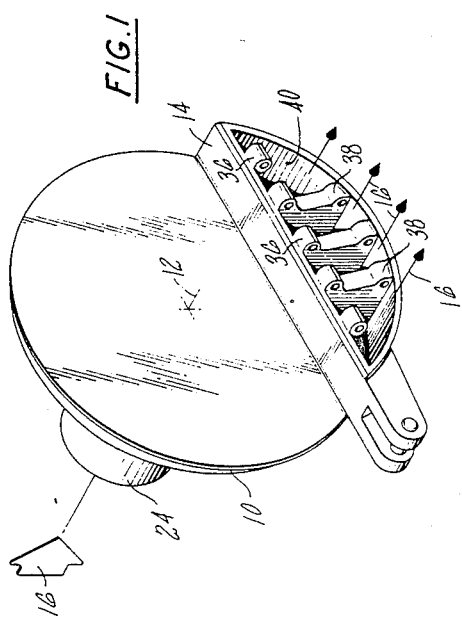
FIG. 1 shows an isometric view of one of the sidewall members of the flap arrangement according to the present invention.

FIG. 1 shows an isometric view of a sidewall member 10 which forms a portion of the lateral boundaries of a thrust vectoring 2-D exhaust nozzle for a gas turbine engine (not shown) or the like. The sidewall member 10 or disk, is rotatable about a pivot axis 12 for positioning a flow diverting flap, a stub portion of which 14 is shown in FIG. 1. The flap extends transversely across the flowing exhaust gas stream (not shown in FIG. 1) and may be selectably positioned to control the nozzle outlet area, exhaust gas flow direction, or both.

Figure 2:
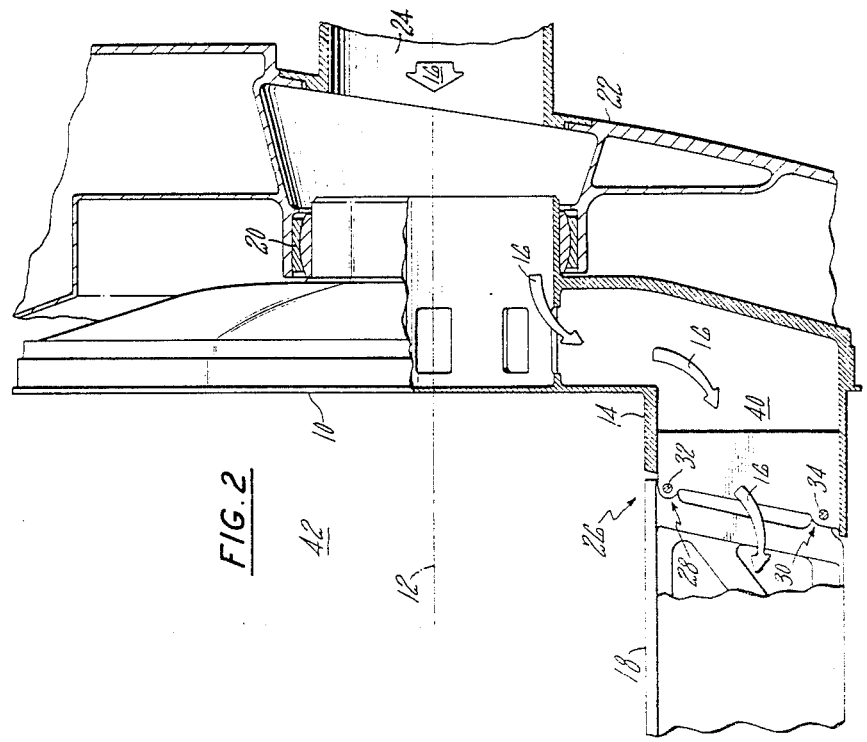
FIG. 2 shows a spanwise section of the assembled central flap portion and sidewall member according to the present invention.

The flap contacts hot exhaust gases having temperatures in the range of 4,000 F., or higher. To protect the flap surface and internal structures from the high temperature environment, a cooling gas 16 such as air is admitted into the sidewall member 10 and conducted internally into the stub portion of the flap 14. It should be understood that the sidewall member 10 as shown in FIG. 1 is merely one-half of the supporting arrangement for the transversely extending flap which engages a similar but oppositely oriented sidewall member (not shown) in the opposite lateral nozzle flow boundary. The stub flaps 14 which extend from the sidewall members 10 engage a central, removable flap portion 18 as shown in FIG. 2. FIG. 2 gives further details as to the sidewall member 10 and the bearings 20 for permitting rotation about the pivot axis 12. The bearings 20 are disposed intermediate the sidewall member 10 and the nozzle static structure 22 for permitting rotation of the assembled flap while receiving a flow of cooling air 16 through a cooling air supply duct 24.

FIG. 2 shows a detailed cross sectional view of the flap joint 26 according to the present invention. Referring also to FIG. 1, the joint 26 is seen as a first plurality of lugs 28 alternatingly integral with the central flap portion 18 and the sidewall stub 14. A second plurality 30 of like alternating lugs is spaced apart from the first plurality 28. The two sets 28, 30 of lugs are secured by respective hinge pins 32, 34 which pass sequentially through each lug of the set.

The joint 26 according to the present invention is thus seen as two spaced apart hinge-like connections which form a strong, non-rotatable joint 26 between the sidewall member and stub 14, 10 and the central flap portion 18 of the flap assembly. FIG. 1 shows particularly those lugs 36, 38 of the respective sets 28, 30 which are part of the first sidewall member 10 and corresponding flap stub 14. It will be appreciated that the hinge-like connections 28, 32 and 30, 34, although parallel, are not aligned in the plane of the inward facing surface of the sidewall member 10. This facilitates removal of the central portion 18 of the flap following withdrawal of the elongated pins 32, 34 from the lug sets 28, 30. After such release, the central portion 18 may be lifted into the interior 42 of the nozzle and withdrawn without completely disassembling the sidewall support members and static structure.

As stated above, it is necessary to provide a flow of cooling gas such as relatively cool compressed air furnished from the compressor section of the gas turbine engine (not shown) via the cooling air duct 24. Such flow passes internally through the sidewall member 10 and the integral stub flap 14, entering the central portion 18 of the flap through the flap joint 26. The use of the spaced apart hinge-like connections 28, 32 and 30, 34 of the joint 26 according to the present invention provides a significant free flow area 40 for passing such cooling air between the stub flap 14 and the central portion 18. The cooling air 16 entering the central portion 18 is directed therewithin to internally cool the central portion surface and may be exhausted into the exhaust gas stream or conducted into adjacent structures by any of a plurality of means and methods well known in the art, such as flexible joints, transpiration cooling openings, etc.

Figure 3:
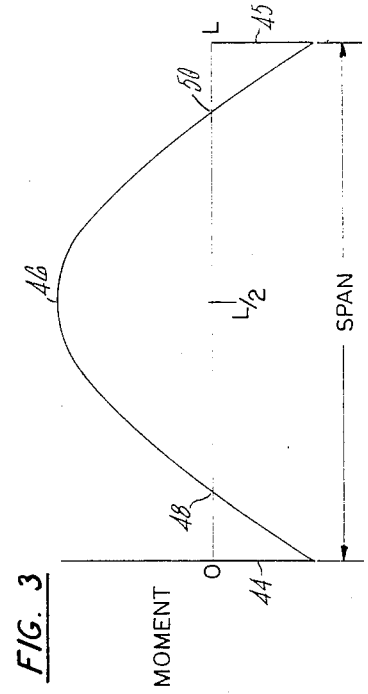
FIG. 3 shows a graph of the magnitude of the transverse bending moment over the span of a flap having offsetting transverse moments imposed at the span ends thereof.

An additional feature of the flap joint according to the present invention involves the spanwise location of the joint 26. For exhaust nozzles having a positive internal gas static pressure, it will be apparent to those skilled in the art that those surfaces of the sidewall members 10 and central flap portion 18 facing the nozzle interior 42 will be subject to significant outward forces resulting from the distributed gas static pressure loading. As discussed in copending application Ser. No. 019,996, referenced hereinabove, an integral sidewall member and cantilevered flap arrangement as shown in FIG. 2 will experience reduced mid span flap deflection by causing the sidewall members 10 to impart a resultant negative moment at the span ends of the flap 14, 18 to counteract the positive moment induced by the gas static pressure loading. FIG. 3 shows the variation of transverse moment over the length L of the flap span. The zero span displacement point is adjacent one of the opposing sidewall members 10 while the L span displacement represents the other span end of the flap adjacent the other sidewall member.

As will be appreciated by those skilled in the art, the negative moments 44, 45 imposed by the sidewall members at each span end of the cantilevered flap reduce the overall magnitude of the mid span, L/2, moment 46 and hence the corresponding mid span elastic displacement. This distribution also results in two loci of null moment 48, 50 located intermediate the flap mid span L/2 and the span ends zero, L.

It is a feature of the joint arrangement according to the present invention that the joints 26 between the central flap portion 18 and the stub flaps 14 are located coincident with the null moment loci 48, 50. As a result of such placement, the joints 26 are subject to only shear force loading and are thus not required nor reinforced to withstand transverse bending moments or like forces. The resulting simplicity of the forces supported at the joints 26 reduces the structural reinforcement required to support the central flap portion 18 thus increasing the flow area 40 available to admit cooling air into the central flap portion as well as decreasing the overall and local weight of the joint 26 and assembled flap 14, 18.

The flap arrangement according to the present invention is thus seen as a lightweight, simple structure for securing and supporting the transverse, flow directing flap in a thrust vectoring nozzle for a gas turbine engine. The joint arrangement further provides for the easy removal and replacement of the central flap portion 18 without disassembly and consequent disruption of the sidewall members 10 and the associated bearing and static structure 20, 22. By locating the joints 26 at a locus of null moment along the flap span, the present invention minimizes the magnitude and complexity of the forces exerted on the individual joint components further reducing the weight and maximizing the flow area 40 available for admitting cooling air from the sidewall member interior into the interior of the central flap portion 18.

It will further be appreciated that the foregoing description and illustrated embodiment is intended to illustrate only one flap support arrangement according to the present invention and should thus not be interpreted as implying any limitations thereto except as specifically recited in the following claims.

I claim:

1. A transverse, pivotable flap for a gas turbine engine exhaust nozzle, comprising:

first and second sidewall members rotatable about a common pivot axis, each sidewall member having a first row of aligned lug projections and a parallel, spaced apart second row of aligned lug projections, a flap, extending spanwisely parallel to the common pivot axis and having a first span end and a second span end, each of the flap span ends including a first row of aligned lug projections and a second row of aligned lug projections corresponding to the lug projections of the sidewall members and alternating therewith for forming first and second hinge means for securing the first sidewall member to the first flap span end, and third and fourth hinge means for securing the second sidewall member to the second flap span end, and at least four elongated pins, each pin being received within one of the hinge means and being passed alternatingly through the lug projections of the corresponding sidewall member and flap.

2. The flap as recited in claim 1, wherein the flap and sidewall members are subject to a positive gas static pressure in the nozzle interior, and wherein the sidewall members each exert a moment force at the corresponding adjacent flap span end for creating a negative resultant moment at the flap span ends and a positive resultant moment at the flap mid span, and wherein the hinge means are located along the span of the joined flap and sidewall members at the points of null resultant moment intermediate the flap mid span and span ends.

3. The flap as recited in claim 1, wherein the flap further includes an internal flow passage for receiving a flow of cooling gas from at least one of the sidewall members.

* * * * *